United States Patent [19]

Becker

[11] 4,417,773

[45] Nov. 29, 1983

[54] BALL SWIVEL JOINT FOR AN EXCAVATOR OR THE LIKE

[75] Inventor: Anton Becker, Neuss, Fed. Rep. of Germany

[73] Assignee: Maschinenfabrik Buckau R. Wolf Aktiengesellschaft, Grevenbroich, Fed. Rep. of Germany

[21] Appl. No.: 959,878

[22] Filed: Nov. 13, 1978

[30] Foreign Application Priority Data

Nov. 24, 1977 [DE] Fed. Rep. of Germany ....... 2752487

[51] Int. Cl.³ .................... F16C 19/18; F16C 33/58
[52] U.S. Cl. .................................. 308/178; 308/183; 308/196
[58] Field of Search .......... 308/174, 178, 183, 189 R, 308/196, 198, 221, 230

[56] References Cited

U.S. PATENT DOCUMENTS 1,644,611 10/1927 Reiffert ............................ 308/196
2,364,951 12/1944 Corte ................................ 308/221
2,488,825 11/1949 Palumbo .......................... 308/183
3,748,002 7/1973 Barker et al. .................... 308/174

FOREIGN PATENT DOCUMENTS 152023 6/1921 United Kingdom ............ 308/196
204864 10/1923 United Kingdom ............ 308/196

Primary Examiner—Richard R. Stearns
Attorney, Agent, or Firm—Michael J. Striker

[57] ABSTRACT

A swivel joint has a first U-shaped ring member including two first leg portions which bound a recess therebetween, and a secnod T-shaped ring member having a second leg portion which is received in the recess bounded by the first leg portions. Each of the first leg portions has a first semi-spherical groove, and a second leg portion has two second semi-spherical grooves each forming with a respective first semi-spherical groove a spherical groove. Two rows of balls are provided, each received in a respective one of the thus-formed spherical grooves. The first leg portions may have throughgoing passages through which the balls can be inserted. The passages may be closed by inserts.

1 Claim, 2 Drawing Figures

BALL SWIVEL JOINT FOR AN EXCAVATOR OR THE LIKE

BACKGROUND OF THE INVENTION

The present invention relates to a ball swivel joint for rotatably mounting a structure on a support of an excavator, rotatable crane and the like. More particularly, it relates to a swivel joint including two ring members having spherical grooves in which two rows of balls are received.

Swivel joints of the above-mentioned general type have been proposed in the art. In an excavator or the like such a swivel joint must take up forces acting in various different directions under conditions in which there is no central connection between the upper rotatable structure and the lower immovable support of the machine which are connected by the joint. To make this possible, a swivel joint has been proposed which consists of three parts arranged one above the other and is provided with two rows of balls, as disclosed in the German patent 947,240. Such a construction is complicated and is difficult to manufacture when large diameters are required. It also has the disadvantage that a force which acts from a respective side of the swivel joint is taken up by only one row of the balls in dependence upon the side from which the force is applied.

SUMMARY OF THE INVENTION

Accordingly, it is an object of the present invention to provide a swivel joint which avoids the disadvantages of the prior art.

More particularly, it is an object of the present invention to provide a swivel joint in which all bearing balls are simultaneously loaded under all loading conditions.

In keeping with these objects and with others which will become apparent hereinafter one feature of the present invention resides, briefly stated, in a swivel joint in which a first ring member is U-shaped and has two first leg portions bounding a recess therebetween, and a second ring member is T-shaped and has a second leg portion which is received in the recess bounded by the first leg portions of the first ring member, wherein the leg portions of these members are provided with semi-spherical grooves which are so arranged that they together form two spherical grooves in which two rows of balls are received.

The swivel joint which is constructed in accordance with the present invention has a simple construction, is easy to manufacture, and has the advantage that when vertical and horizontal forces are applied, both rows of balls take up these forces without vertical displacement of the ring members relative to one another.

Another feature of the present invention is that the first leg portions of the first U-shaped ring member may be provided with through-going passages which communicate with respective semi-spherical grooves so that the balls can be inserted into the latter through these passages. The passages may be outwardly closed by insert members.

Still another feature of the present invention is that the leg portions may be so dimensioned that two gaps are formed between the first leg portions and the second leg portion, each gap being formed between the second leg portion and a respective one of the first leg portions.

In accordance with a further feature of the present invention, the two rows of balls may be so positioned that a center line of each row is located in the region of a respective one of the above-mentioned gaps.

Still a further feature of the present invention is that each of the gaps has an upper section and a lower section which are located respectively above and below a respective one of the rows of balls, and are offset relative to one another in a horizontal direction.

An additional feature of the present invention is that the first U-shaped ring member is located below the second T-shaped ring member, and the first leg portions of the former extend upwardly, whereas the second leg portion of the latter extends downwardly. When a gap is formed between the first leg portions and the second leg portion, the gap being filled by oil, the lower U-shaped ring member may serve as an oil container for forming an oil bath.

In accordance with still an additional feature of the present invention, relief notches may be provided in the ring members, each notch communicating with a respective semi-spherical groove. The notches may be arranged at the same upright location.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
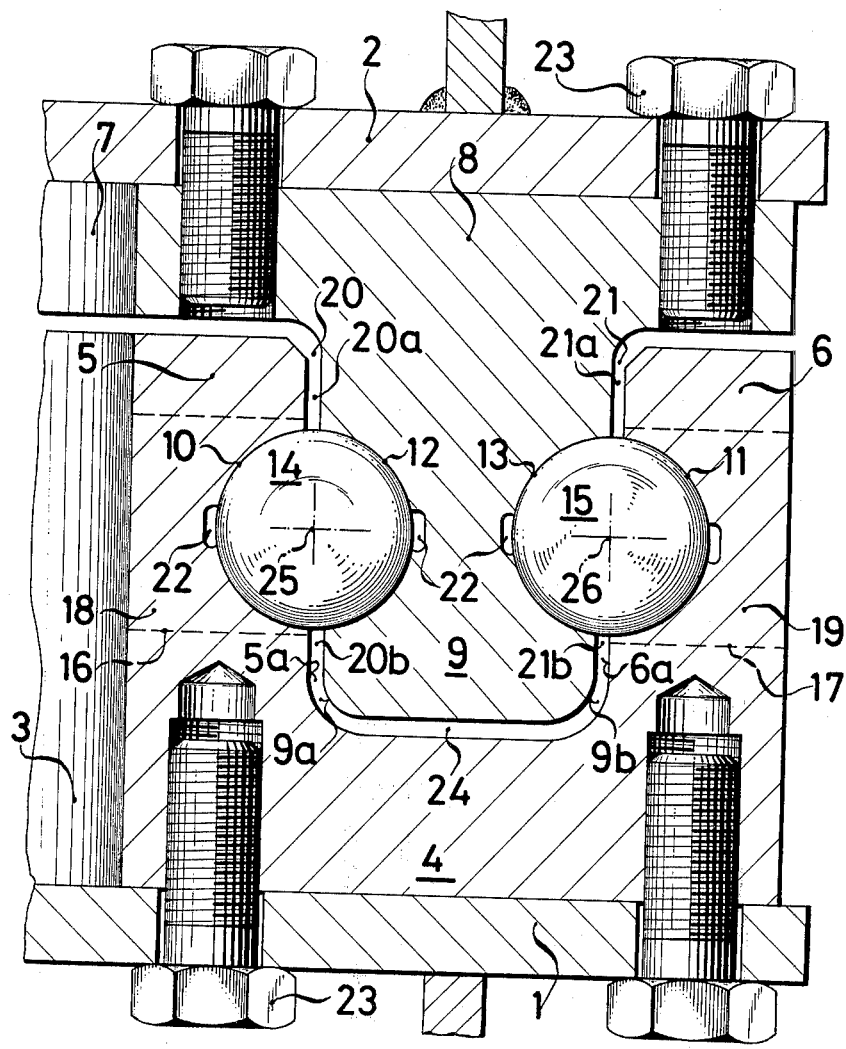
FIG. 1 is a partial axial section of a ball swivel joint in accordance with the present invention.
Figure 2:
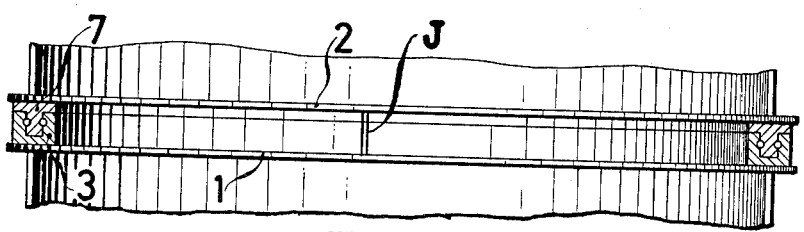
FIG. 2 is a complete axial section of the ball swivel joint.

A ball swivel joint in accordance with the present invention is arranged between a lower annular support member 1 which is connected with a not-shown supporting frame of an excavator or the like, and an upper annular support member 2 connected with a not-shown upper structure of the same. The ball swivel joint itself includes a lower U-shaped ring member 3 which is fixedly connected with the lower support member 1 by lower screws 23, and an upper ring member 7 which is fixedly connected with the upper support member 2 by upper screws 23.

The U-shaped ring member 3 has two upwardly extending leg portions 5 and 6 which bound a recess. The T-shaped ring member 7 has a downwardly extending leg portion 9 which is received in the recess bounded by the leg portions 5 and 6 of the ring member 3. The leg portion 9 of the T-shaped ring member 7 extends downwardly from a flange portion 8, whereas the leg portions 5 and 6 of the U-shaped ring member 3 are connected with one another by a flange portion 4 and extend upwardly from the latter. The leg portions 5 and 6 have inner faces 5a and 6a each provided with an inwardly open semi-spherical groove 10 and 11, respectively. The leg portion 9 has outer faces 9a and 9b which are, in turn, provided with two outwardly open semi-spherical grooves 12 and 13. The grooves 10 and 11 as well as the grooves 12 and 13 are arranged at the same upright location. The semi-spherical grooves 10 and 12, on the one hand, and the semi-spherical grooves 11 and 13, on the other hand, form two spherical grooves.

The inventive ball swivel joint has two rows of balls 14 and 15 each received in a respective one of the thus-formed spherical grooves. The leg portions 5 and 6 of the U-shaped ring member 3 are provided with through-going passages 16 and 17 through which the balls 14 and 15 can be inserted. The passages 16 and 17 are closed by insert member 18 and 19, respectively.

The leg portion 9 of the T-shaped ring member 7 and the leg portions 5 and 6 of the U-shaped ring member 3 are so dimensioned that when the former is inserted into the latter two gaps 20 and 21 are formed. The gap 20 is formed between the leg portions 9 and 5, wherein the gap 21 is formed between the leg portions 9 and 6. The gaps 20 and 21 guarantee a certain movement of the ring member 7 relative to the ring member 3. When the gaps 20 and 21 are so arranged that they are located in the region of axes of the rows of balls 14 and 15, all load bearing faces which are formed between the balls and the grooves will be identical. In operation of an excavator or the like, it is very rare that forces are applied in a purely vertical direction. Very frequently the forces act on a swivel joint in an inclined direction from below and from above, and at the same time these forces have differing magnitudes. The inventive swivel joint is so constructed that by the use of simple means it can take up differing forces and at the same time prevent lifting and/or tilting of the upper structure of the machine in which it is utilized. For this purpose, the gaps 20 and 21 are differently constructed in the regions above and below the balls 14 and 15. Gap portions 20b and 21b which are located below the balls 14 and 15 are located closer to one another than gap portions 20a and 21a located above the balls 14 and 15. Thereby, in an upper half and in a lower half of the balls differing bearing faces are formed.

When, for instance, the gap portion 20a is farther offset to the left and the gap portion 20b is farther offset to the right, the bearing face formed between the new gap portion 20a and a relief zone or notch 22 at the left side will be smaller, and that at the right side will be greater. Thereby, in a lower part the bearing face formed in the lower right half is smaller, and that formed in the lower left half is greater. In this case higher forces from above (or vice versa) can be taken up. All relief notches 22 are arranged at an identical upright location.

As for the operation of the inventive swivel joint, it makes no difference whether the U-shaped ring member 3 is located below the T-shaped ring member 7 or above the latter. However, the lower location of the U-shaped ring member 3 has the advantage that in this case it serves as an oil container forming an oil bath 24 from which efficient lubrication of the spherical faces can be reliably performed.

It is to be understood that each ring member 3 and 7 may be manufactured from several segments which butt one another at the point J (as shown in FIG. 1) and can be thereafter connected to the annular support members 1 and 2 by the screws 23. The several segments are not shown in the drawing for the sake of clarity. The thus-constructed ring members are easy to manufacture because the segments can form swivel joints with diameters from 6 to 10 meters or more. Cages or spacers which are needed for guiding the balls in the spherical grooves are not shown in the drawing, since they are known per se in the art.

It will be understood that each of the elements described above, or two or more together, may also find a useful application in other types of constructions differing from the types described above.

While the invention has been illustrated and described as embodied in a ball swivel joint for an excavator or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A ball swivel joint for rotatably mounting a structure on a support of an excavator, rotatable crane or the like, comprising a first ring member having a U-shaped cross section and including two first annular leg portions which bound an annular recess therebetween, each of said first leg portions having a first semi-spherical groove which is open into said recess; a second ring member having a T-shaped cross section and including a second annular leg portion which is received in said recess bounded by said first leg portions, said second leg portion having two second semi-spherical grooves each of which is open toward a respective one of said first semi-spherical grooves and bounds with the same a spherical groove, said leg portions of said first ring member and said second ring member are so dimensioned that two gaps are formed between said first leg portions and said second leg portion, each of said gaps being formed between said second leg portion and a respective one of said first leg portions and having an upper section located above said ball members and a lower section located below the same, said leg portions of said first ring member and said second ring member being so formed that the upper section of each of said gaps is offset relative to the lower section of the same gap; and two rows of ball members each received in a respective one of the thus-formed spherical grooves.

* * * * *